Figure 1:
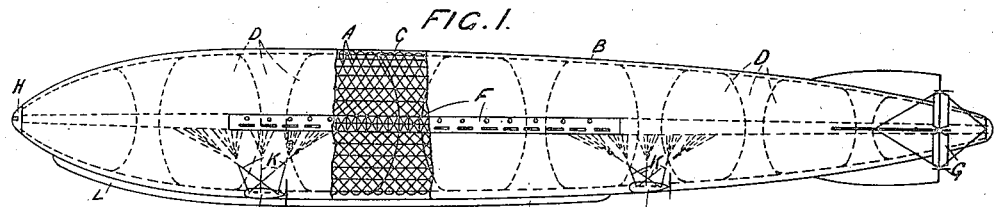

I. ANDERSSON.
AIRSHIP.
APPLICATION FILED MAR. 5, 1919. RENEWED AUG. 18, 1920.

1,372,925.  Patented Mar. 29, 1921.

WITNESSES.

INVENTOR.

UNITED STATES PATENT OFFICE.

IVAN ANDERSSON, OF EAST ELMHURST, NEW YORK.

AIRSHIP.

1,372,925. Specification of Letters Patent. Patented Mar. 29, 1921.

Application filed March 5, 1919, Serial No. 280,827. Renewed August 18, 1920. Serial No. 404,478.

*To all whom it may concern:*

Be it known that I, IVAN ANDERSSON, a subject of the King of Sweden, residing at East Elmhurst, in the county of Queens and State of New York, have invented new and useful Improvements in Airships, of which the following is a specification.

This invention relates to airship construction and has for its object to increase safety and efficiency in the operation of airships. According to this invention the aerostat consists of an outer non-rigid casing which carries internal suspension members attached to it preferably in the manner described and claimed in my patent application for improvements in airships, Serial No. 280,100, filed on Mar. 1, 1919, and an internal supporting body. This supporting body may consist of a non-rigid casing inflated with the lifting gas and subdivided by partitions, but is preferably made up of a plurality of nonrigid inflated elements, which are straddled or embraced by the internal suspension members attached to the external casing. The space formed between the external casing and the internal supporting body is filled with compressed air blown in by suitable means. Along each side of the aerostat and between the external casing and the internal supporting body is arranged a flexible girder or lattice work beam, i. e., a girder or beam constructed of rigid members but provided with flexible joints at suitable places in order to enable the girder to accommodate itself to the expanding or contracting aerostat. This girder is attached to and supported by the internal suspension members. Any load or thrust applied to this girder will be transmitted to the internal suspension members and distributed over the aerostat. The girder may be made large enough to provide accommodation for passengers, crew, or any desirable load, and may extend through the outer casing. It is then so inclosed as to be unaffected by the air pressure prevailing in the annular space between the external casing and the internal supporting body. The control surfaces of the airship are preferably mounted to this girder which makes the control wires independent of any expansion or contraction of the aerostat. The girder supports with great advantage a rigid nose cap for preventing any deformation of the nose due to external air pressure. The internal suspension attached to the external casing is continued below the girder and around the envelop to enable any desirable loads to be suspended at a lower level, as for instance, tanks for fuel and water, and the motor nacelles, when direct connection of the same with the girder is inconvenient. On the lower side of the external casing are mounted bumpers for taking shocks on landing and prevent any tearing of the casing.

Figure 2:
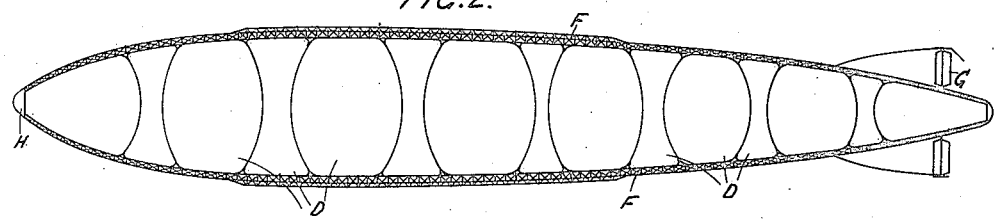

In the annexed drawing which illustrates the invention: Figure 1 shows an airship in elevation with the external casing partly removed, Figs. 2 and 3 show horizontal and transverse sections respectively of the same airship, and Fig. 4 shows in detail the arrangement of the girder to a larger scale.

Figure 3:
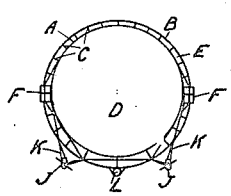
Figure 4:
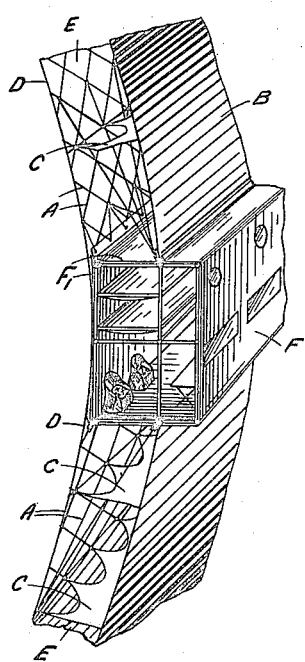

The internal suspension cords A are attached to the outer casing B by means of webs C, Figs. 1 and 3. Straddled or embraced by these suspension cords are the supporting elements D. These elements are inflated with the lifting gas and naturally will press themselves against the network formed by the suspension cords A. In this way the load is supported in two ways; by the external casing, and by the internal supporting body, although independently. Should for instance, the external casing B be ripped and the annular space E become devoid of its air pressure, the load would still be supported by the suspension cords A which straddle the gas-containing elements D. Or should one of these elements be pierced, or somehow badly leak, the internal air pressure in the external casing would keep the load suspended from the outer casing through the internal suspension members. In a third eventuality of the external casing being ripped, and one of the gas-containing elements become devoid of its gas at the same time, girders F are arranged on both sides of the aerostat and attached to the suspension cords A. These girders will bridge the gap formed by the empty element and transmit the load and thrust to the gas-containing elements, enabling the airship to be still operated and safely landed. These girders are suspended between the external casing and the internal supporting elements, but partly extend outside the outer casing to provide space for accommodating passengers and other load. It is inclosed and separated from the annular airspace E by airtight walls $F_1$. The horizontal fins, the rudders and elevators G are mounted on the girders F which also support the nose cap H. This nose cap may be large enough to accommodate the pilot and the necessary instruments and controls. The motors are mounted in cars J suspended by cables K on the sides of the lower part of the aerostat, the cables K being connected to the girders F. On the lower side of the external casing B is arranged a bumper L for absorbing landing shocks. It is preferably made of rubberized fabric and inflated with compressed air.

I claim as my invention:

1. In a dirigible aerostat, an external non-rigid casing, an internal non-rigid supporting body, a space between the external casing and the internal supporting body, internal tension members suspended from the external casing and straddling the internal supporting body, and means for connecting said tension members with the load.

2. In a dirigible aerostat, an external non-rigid casing, an internal non-rigid supporting body, a space between the external casing and the internal supporting body, internal tension members suspended from the external casing and straddling the internal supporting body, means for connecting a load to said tension members, and flexible girders supported by said tension members and arranged alongside the horizontal meridians of the aerostat.

3. In a dirigible aerostat, an external non-rigid casing, an internal non-rigid supporting body, a space between the external casing and the internal supporting body, internal tension members suspended from the external casing and straddling the internal supporting body, means for connecting a load to said tension members, flexible girders supported by said tension members and arranged alongside the horizontal meridians of the aerostat, accommodations for passengers and crew arranged in said girders, a nose cap for the aerostat supported by the girders, control surfaces for steering mounted on the girders, and motor nacelles suspended from said girders.

4. In a dirigible aerostat, an external non-rigid casing, an internal non-rigid supporting body, a space between the external casing and the internal supporting body, internal tension members suspended from the external casing and straddling the internal supporting body, means for connecting a load to said tension members, flexible girders supported by said tension members and arranged alongside of the horizontal meridians of the aerostat, accommodations for passengers and crew arranged in said girders, a nose cap for the aerostat supported by the girders, control surfaces for steering mounted on the girders, motor nacelles suspended from said girders, and shock absorbers for landing mounted on the lower side of the external casing.

5. In a dirigible aerostat, an external non-rigid casing, an internal non-rigid supporting body, a space between the external casing and the internal supporting body, internal tension members suspended from the external casing and straddling the internal supporting body, means for connecting a load to said tension members, flexible girders supported by said tension members and arranged alongside the horizontal meridians of the aerostat, accommodations for passengers and crew arranged in said girders, a nose cap for the aerostat supported by the girders and containing accommodation for pilot and controls, control surfaces for steering mounted on the girders, motor nacelles suspended from said girders, and shock absorbers for landing mounted on the lower side of the external casing.

IVAN ANDERSSON.

Witnesses:
 PAULINE B. HURWITZ,
 JAMES S. HURWITZ.